US011622289B2

(12) United States Patent
Broustis et al.

(10) Patent No.: US 11,622,289 B2
(45) Date of Patent: Apr. 4, 2023

(54) AUTOMATED CONFIGURATION ENFORCEMENT IN WIRELESS COMMUNICATION SYSTEMS

(71) Applicant: AT&T Intellectual Property I, L.P., Atlanta, GA (US)

(72) Inventors: Ioannis Broustis, Basking Ridge, NJ (US); Sarat Puthenpura, Berkeley Heights, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 58 days.

(21) Appl. No.: 17/242,719

(22) Filed: Apr. 28, 2021

(65) Prior Publication Data

US 2022/0353706 A1 Nov. 3, 2022

(51) Int. Cl.
*H04W 24/04* (2009.01)
*H04W 24/08* (2009.01)

(52) U.S. Cl.
CPC ........... *H04W 24/04* (2013.01); *H04W 24/08* (2013.01)

(58) Field of Classification Search
CPC .............................. H04W 24/04; H04W 24/08
See application file for complete search history.

(56) References Cited

U.S. PATENT DOCUMENTS

| 5,956,719 | A  | * | 9/1999  | Kudo     | H04L 41/024  |
|           |    |   |         |          | 707/797      |
| 2014/0162664 | A1 | * | 6/2014  | Stapleton | H04W 16/04  |
|           |    |   |         |          | 455/445      |
| 2017/0373950 | A1 | * | 12/2017 | Szilagyi | H04L 43/091  |
| 2019/0372852 | A1 | * | 12/2019 | Aparicio | H04L 43/0876 |

* cited by examiner

*Primary Examiner* — Said M Elnoubi
(74) *Attorney, Agent, or Firm* — Amin, Turocy & Watson, LLP

(57) ABSTRACT

The disclosed technology is directed towards automated configuration enforcement in wireless communication systems, which can be implemented in an audit manager (e.g. an ONAP micro-service) as part of an overall architecture. The audit manager obtains misconfiguration data representing misconfigured configurable parameter data of network elements of a radio access network, and corrective parameter data corresponding to the misconfiguration data. The audit manager issues a reconfiguration action to the network elements, which instructs the network elements to reconfigure their current configurable parameter data based on the corrective parameter data. Following reconfiguration, the audit manager operates to monitor the network elements performance, e.g., to check for performance degradation of a cell site relative to previous performance metrics.

20 Claims, 14 Drawing Sheets

AUTOMATED CONFIGURATION ENFORCEMENT IN WIRELESS COMMUNICATION SYSTEMS

TECHNICAL FIELD

The subject application relates to wireless communications systems in general, and more particularly to configuring cellular wireless communications systems, including fourth generation long term evolution (4G LTE) networks, fifth generation/new radio (5G/NR) networks and beyond.

BACKGROUND

Proper configuration of radio equipment including radio network nodes (e.g., 4G LTE eNodeBs and 5G gNodeBs) and cell sites based on vendor specifications and operator standards is needed for the radio equipment to operate both efficiently and predictably. Thus, ensuring that radio equipment is correctly deployed and configured based on appropriate parameter values is fundamental to operating a wireless mobile broadband network.

However, the task of properly configuring the various parameters, while ensuring that cell sites remain healthy after configuration, is a tedious and time-consuming task. For example, consider an example region having on the order of 2,000 base stations, with each base station comprised of around ten cells; for each there are on the order of 5,000 parameters that can be configured. Of these many millions of configurable parameters, there can be millions of misconfigured parameters that can be reconfigured for more optimal wireless mobile broadband network operation.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
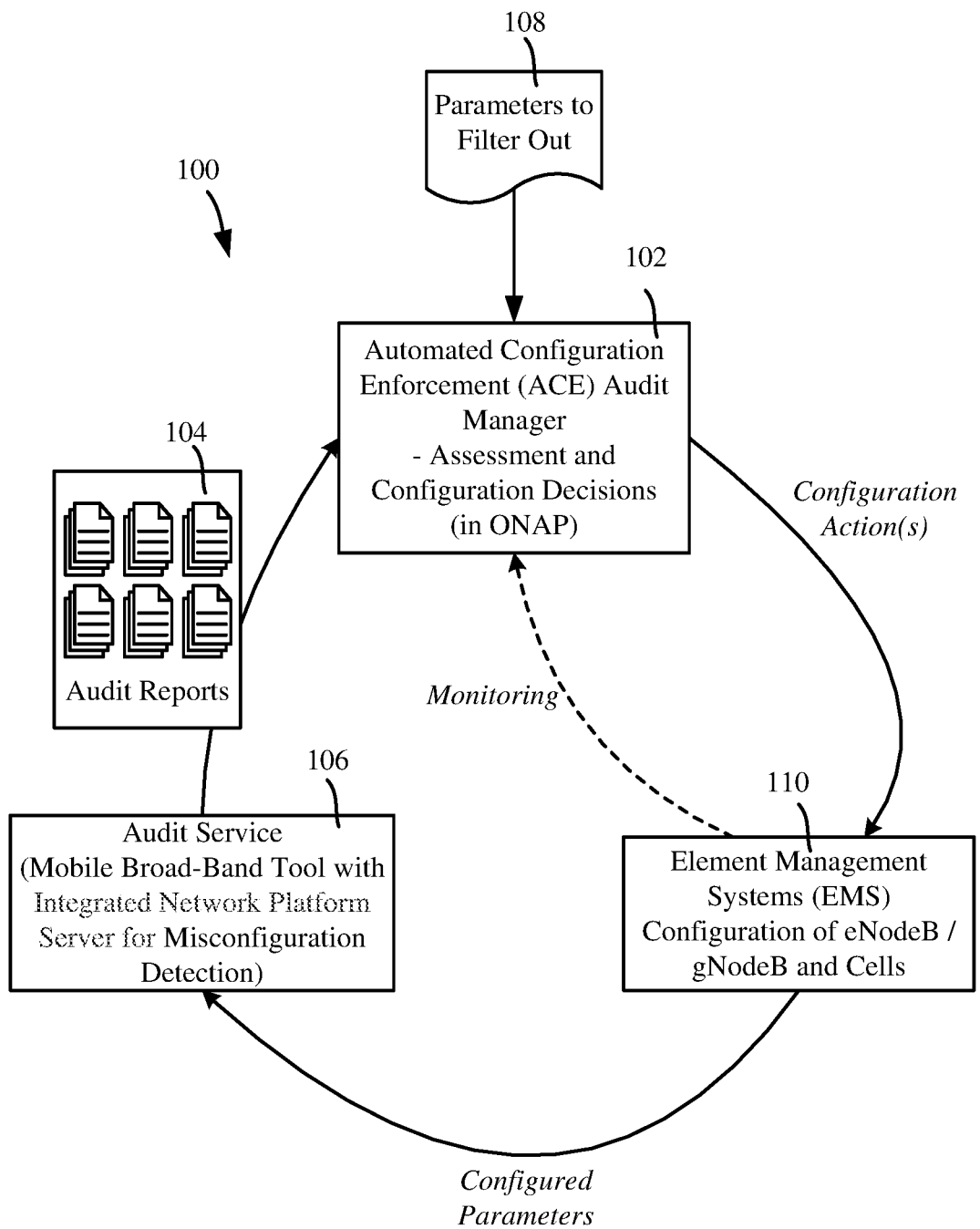
FIG. 1 illustrates a block diagram of an example system that can facilitate automated reconfiguration of network elements, in accordance with various aspects and embodiments of the disclosed subject matter.

The technology described herein is generally directed towards automating the analysis and correction of misconfigured network element parameters, e.g., on the order of millions, across a mobile broadband network. In one aspect, the automation is handled by an automatic configuration enforcement audit manager (or more simply "audit manager"), which in general is operated and controlled by radio access network (RAN) engineers. Note that while RAN is one use of the audit manager, automated configuration solutions beyond RAN can be implemented via the audit manager.

In one implementation, the audit manager leverages the Open Network Automation Platform (ONAP) control-loop functional architecture to automate the analysis and configuration of parameter values. The audit manager interfaces with an audit web server (e.g. MBBT, or Mobile Broadband Tool) to obtain configuration audits on demand, in which the configuration audits identify detected misconfigured parameters and provide corrective parameter values. The audit manager analyzes the detected misconfigured parameters and decides which of those are intended to be corrected. The audit manager further interfaces with RAN element management systems (EMS), e.g., via a web application programming interface (web API), in order to issue the appropriate reconfiguration actions to the radio network equipment.

Additionally, the automatic configuration enforcement audit manager monitors the performance of each cell in each site that the audit manager has configured, in order to ensure that there are no performance anomalies upon configuration/reconfiguration. For monitoring, the audit manager obtains alerts or the like based on real-time key performance index (KPI) feeds. In this way, the audit manager technology facilitates a very high degree of gold standards compliance in a radio access network.

It should be noted that terms used herein, such as "optimize," "optimization," "optimal" and the like only represent objectives to move towards a more optimal state, rather than necessarily obtaining ideal results. For example, "optimizing" a network/system means moving towards a more optimal state, rather than necessarily achieving an optimal result. Similarly, "maximize", such as to "maximize throughput" means moving towards a maximal state, not necessarily achieving such a state.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example block diagram of FIG. 1, a system 100 facilitates configuration of base stations (e.g., eNodeB/gNodeB) and corresponding cells based on modifying (fixing) misconfigured parameters. In one aspect, an automated configuration enforcement audit manager 102 automatically obtains the latest parameter configuration status as set forth in audit reports 104 generated by an audit service 106 generally including a mobile broad-band tool with an integrated network platform server for misconfiguration detection.

In general the audit reports 104 contain misconfigured parameters for respective cell sites and their associated base stations/radio network nodes, along with a "gold standard" corrected value for each misconfigured parameter. For example, a parameter value can be identified in the audit report as currently being set to four, whereas the correct value is specified as five. The gold standard value for any parameter is not universal across cell sites, but rather can be different for any given cell site, for example, based on any number of conditions, factors and so forth. The audit service 106 determines the appropriate value to be configured/reconfigured for any given cell site/base station.

Not all misconfigured parameters are deemed significant, or are approved for reconfiguration. The audit manager 102 can decide which of them is to be fixed, using adaptive logic and current network status, as well as by accessing a data structure 108 (such as a list) of parameters to filter out, e.g., insignificant/non-approved parameters. The data structure 108 can be populated by RAN engineers, for example, and can be updated over time.

The audit manager 102 identifies the affected RAN elements corresponding to the misconfigured parameters (post-filtering), and automatically issues corrective actions via a request to a RAN element management systems (EMS) 110. The EMS 110 returns a success or failure result of the reconfiguration request. If the reconfiguration was successful, as described herein, the audit manager 102 monitors the network after the reconfiguration action to ensure that the reconfigured cell sites work with no issues.

Figure 2:
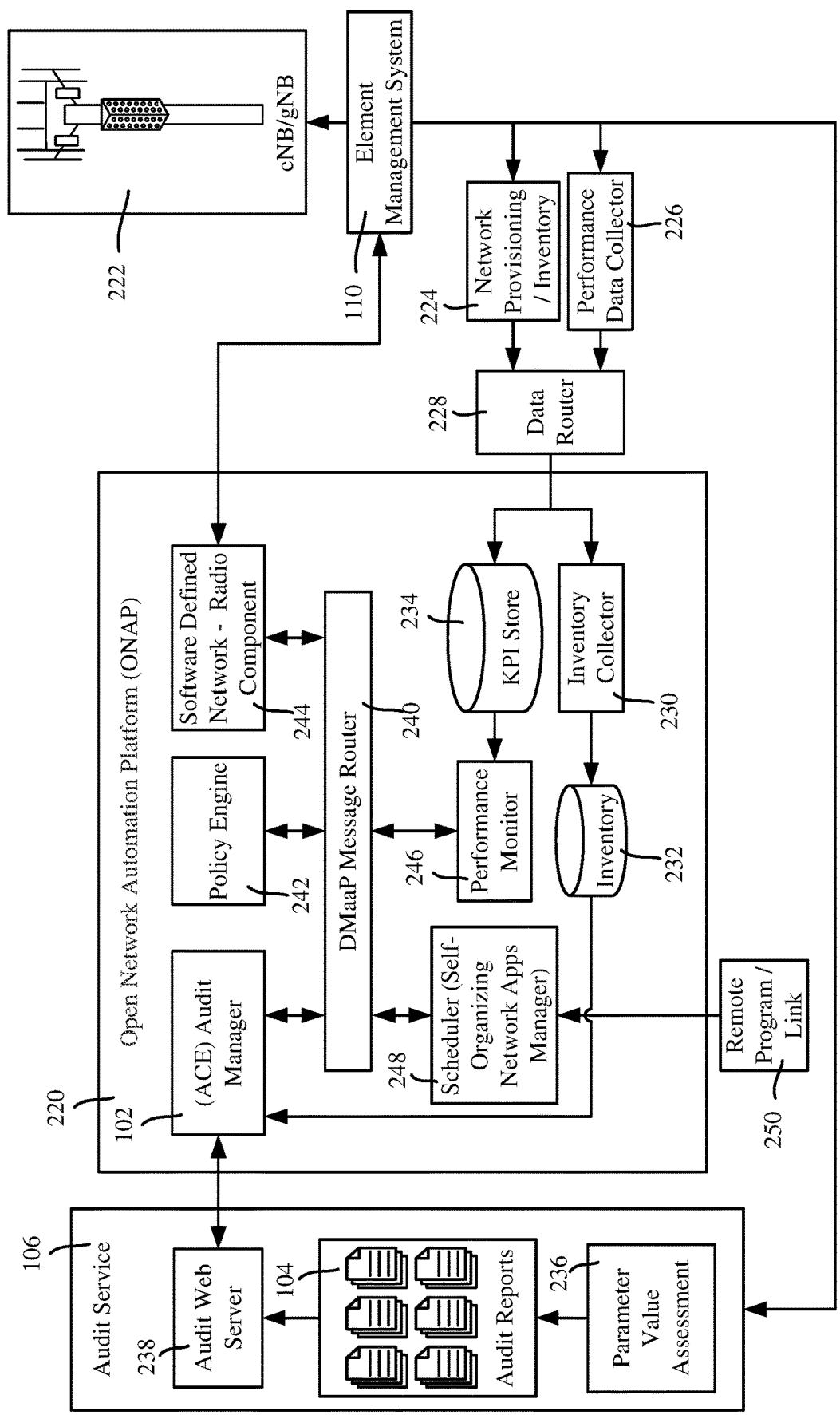
FIG. 2 illustrates a block diagram of an example system that can facilitate automated reconfiguration of misconfigured network element parameters, in accordance with various aspects and embodiments of the disclosed subject matter.

FIG. 2 shows an embodiment of architecture including an instance of the audit manager 102 operating (as a microservice) in an Open Network Automation Platform (ONAP) 220. In general, the network EMS 110, coupled to base stations/cell sites represented by block 222, produces inventory and performance data updates, which are stored in databases/data stores in the ONAP 220. More particularly, a network provisioning inventory manager 224 obtains the inventory data (e.g., the identities of base stations and associated cells and their statuses), and a performance data collector 226 collects performance data; these data are appropriately routed (block 228) as shown in the example of FIG. 2. The inventory data is collected (block 230) and stored in an inventory data store 232, while the performance data is routed to and maintained in a KPI data store 234 of performance metrics. As is known, the inventory can also include information such as which cells are in a particular area/region, where they are located, which are collocated, and basic parameters like cell bandwidth, cell frequency, and the like.

As shown in FIG. 2, parameter data for the components identified in the inventory data store 232 also flows from the EMS 110 to the audit service 106. In the audit service 106, the parameter data values are assessed at block 236, e.g., against gold standard values for the network elements. The misconfigured parameters, along with their actual values and gold standard values, are put into an audit report of the group of audit reports 104. For example, an audit report can be generated per submarket, or any other suitable portion of a mobile broadband network.

In one implementation, the audit manager 102 obtains (pulls) requested audit reports from an audit web server 238 of the audit service 106. The audit manager 102 also collects the information on relevant (e.g., all) inventory from the inventory data store 232. Note that the audit reports 104 only contain information on network elements with misconfigured parameters, and thus may not identify the complete inventory.

In general, based on the information in each audit report, the audit manager 102 decides which network element parameters to reconfigure (correct), including filtering based on the predetermined approved parameters data structure 108 (FIG. 1). From the remaining information, the audit manager 102 constructs outputs for the parameters to update, e.g., output values for parameters A, B and C on specific radio elements (cell X) in region h234.

However, before requesting the reconfiguration, the audit manager publishes the reconfiguration information to a DMaaP (Data Movement as a Platform) message router 240, by which a policy engine 242 receives and evaluates the proposed reconfiguration. The policy engine 242 can allow or reject the proposed reconfiguration, e.g., such as if there is a policy stating that the region that includes the network elements to be reconfigured cannot be modified at present. It should be noted that in one implementation, the audit manager 102 can also maintain its own internal policy checking operations and data 360, FIG. 3). For example, the policy engine 242 can tell the audit manager 102 to make sure that a site to be impacted is currently configurable, e.g., is not undergoing a maintenance procedure. In this way, the audit manager 102 can perform some checks based on internal policy, without involving the policy engine 242 for each such evaluation.

If the policy engine 242 approves the reconfiguration, a software defined network-radio component (SDNR) 244 (configure to operate in ONAP) obtains the reconfiguration request via the DMaaP message router 240, and pushes the configuration to the EMS 110 to reconfigure the corresponding network elements (block 222). The EMS 110 returns with a success or failure status of the reconfiguration, which the SDNR 244 relays back to the audit manager 102 via the DMaaP message router 240.

If the reconfiguration request resulted in a failure being returned, the audit manager 102 can issue a failure alert. Note however that some failures can be minor and can be generally ignored, such as common failures when the EMS 110 cannot communicate with a particular network element, some parameters are wrong. An alert can be generated, or the reconfiguration request can be reattempted at another time.

If the reconfiguration was successful, the audit manager 102 invokes a performance monitor 246 (a micro-service) to start monitoring the performance data of the reconfigured network equipment (block 222) for anomalies, via KPIs collected from the KPI store 234. For example, monitoring can be performed for a configurable time, such as on the order of a couple hours. To evaluate an anomaly such as degraded performance, reduced throughput, or a site outage, the performance monitor 246 evaluates the current, after reconfiguration performance data versus the historical performance data for the site, (e.g., maintained in the KPI store 234 for approximately a month), and creates an alert if an anomaly/reduced performance is detected.

Depending on whether the alert is deemed severe, the audit manager 102 can rollback (revert) the configuration. To this end, the audit manager 102 maintains the prior parameter values, and can perform similar update operations to roll back the parameter values for the modified network element(s) to their prior values. The audit manager 102 also can create an alert for a RAN engineer or the like to investigate the problem. Note that some problems are deemed more important than others. For example, a slight drop in throughput (e.g., relative to some threshold change) following reconfiguration may be deemed acceptable, whereas a large drop in throughput may result in a rollback. An extremely severe issue would be a site downtime/outage after reconfiguration, and can result in a high-level alert being issued for example, (in addition to a rollback attempt).

Also shown in FIG. 2 is a scheduler 248, e.g., a scheduling service, such as implemented as part of a self-organizing network apps manager). For example, via a remote program/link 250, an authorized RAN engineer can generate a recurrent schedule that is activated at a scheduled time to output a work order (FIG. 3) to the audit manager 102. In this way, for example, a submarket or the like can be reconfigured every Friday at 1:00 pm.

Figure 3:
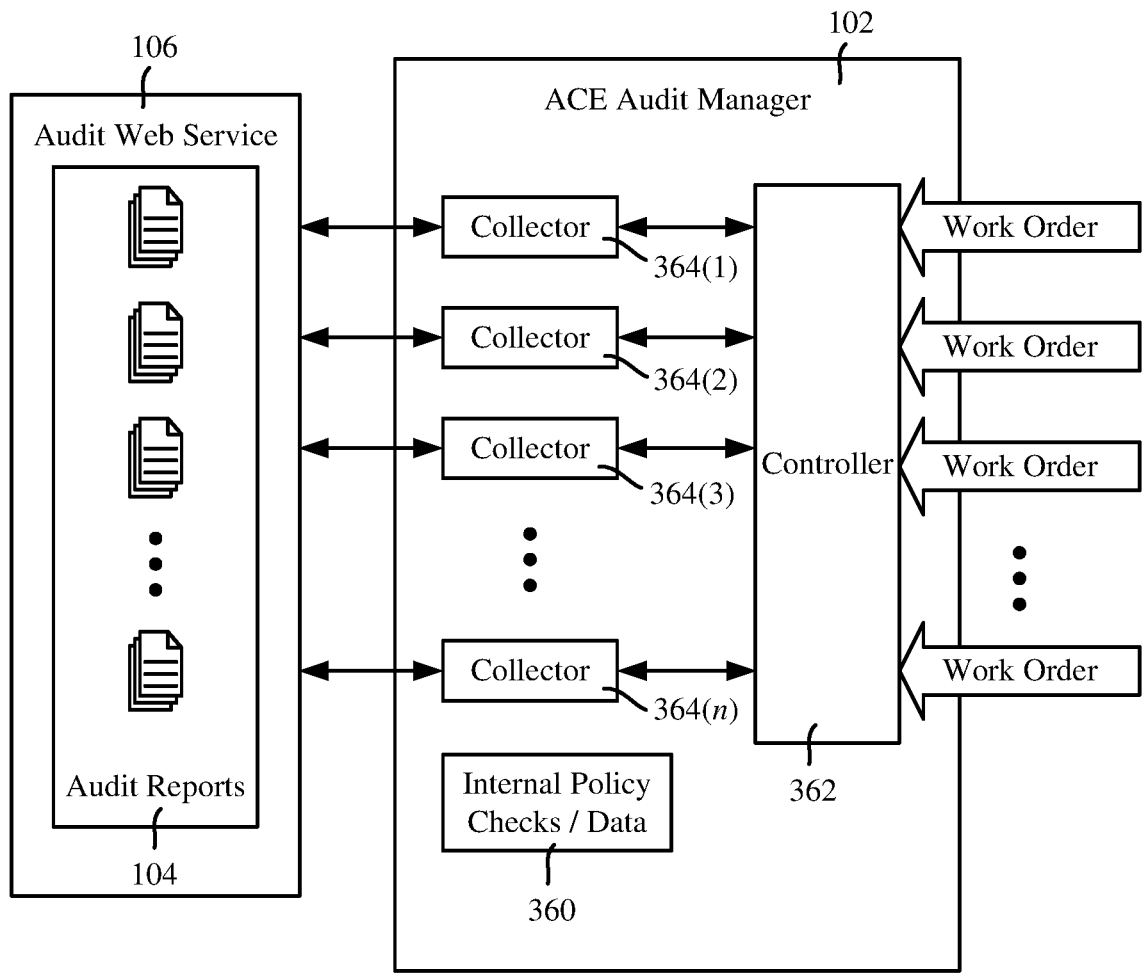
FIG. 3 illustrates a block diagram of an audit manager instantiating collectors to obtain audit reports related to misconfigured network element parameters, in accordance with various aspects and embodiments of the disclosed subject matter.

FIG. 3 shows an example implementation for obtaining the latest audit reports, e.g., per submarket or other portion of a radio access network. In general, the audit web server 238 (FIG. 2) of the audit service enables downloading audit reports 104, e.g., using a custom web API. For example, consider that the audit manager 102 includes a controller 362 that identifies the submarket that is scheduled in a work order. For each submarket, a new audit collector 364(1)-364 (n) is generated on demand to download the corresponding audit file. The audit collector can also perform pre-filtering operations. In one implementation, audit collectors are short-lived, as comprising threaded processes that perform individual tasks within the audit manager 102 (e.g., the audit manager 102 container). Such audit collectors 364(1)-364(n) are thus instantiated as implicated to pull audit reports on demand when the audit manager 102 gets a work order, dispatched at certain times of day. The audit collectors 364(1)-364(n) start the reconfiguration procedure, e.g., for a submarket, by downloading the audit reports from the audit web server. Collectors save resources because they are only created and live when implicated, and are specific to a work order based on what the work order requests.

Further, note that over time more and more configurable parameters are added to the set of the network elements' configurable parameters. The inherent design of an automatic configuration enforcement audit manager allows for horizontal scaling in order to distribute micro-service and platform load across multiple control-loop audit manager instances as well as across integrated cloud clusters.

Figure 4:
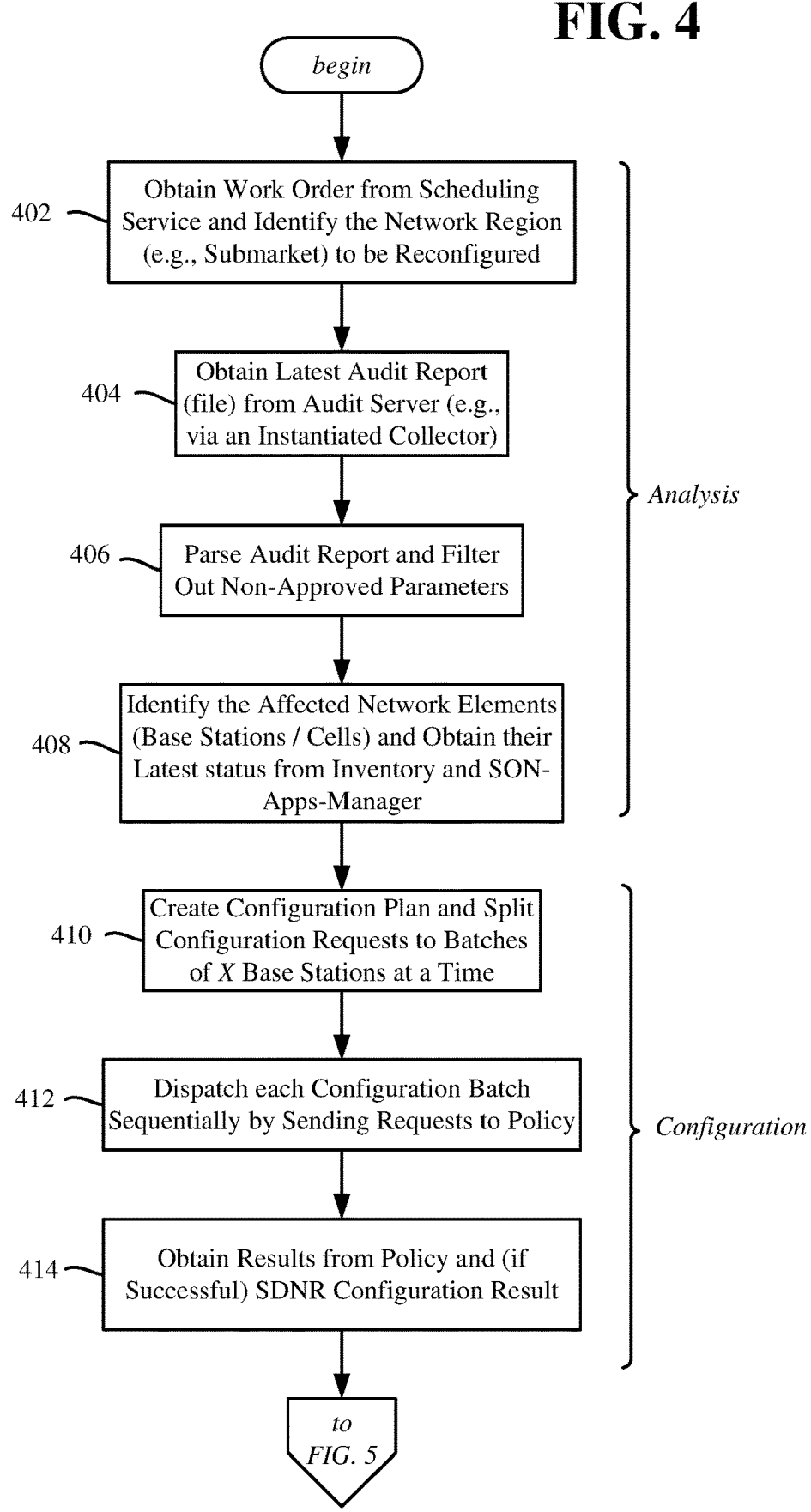
FIGS. 4 and 5 comprise a flow diagram illustrating example operations related to an audit manager for automatically reconfiguring network element parameters, and monitoring performance of the reconfigured network elements, in accordance with various aspects and embodiments of the subject disclosure.
Figure 5:
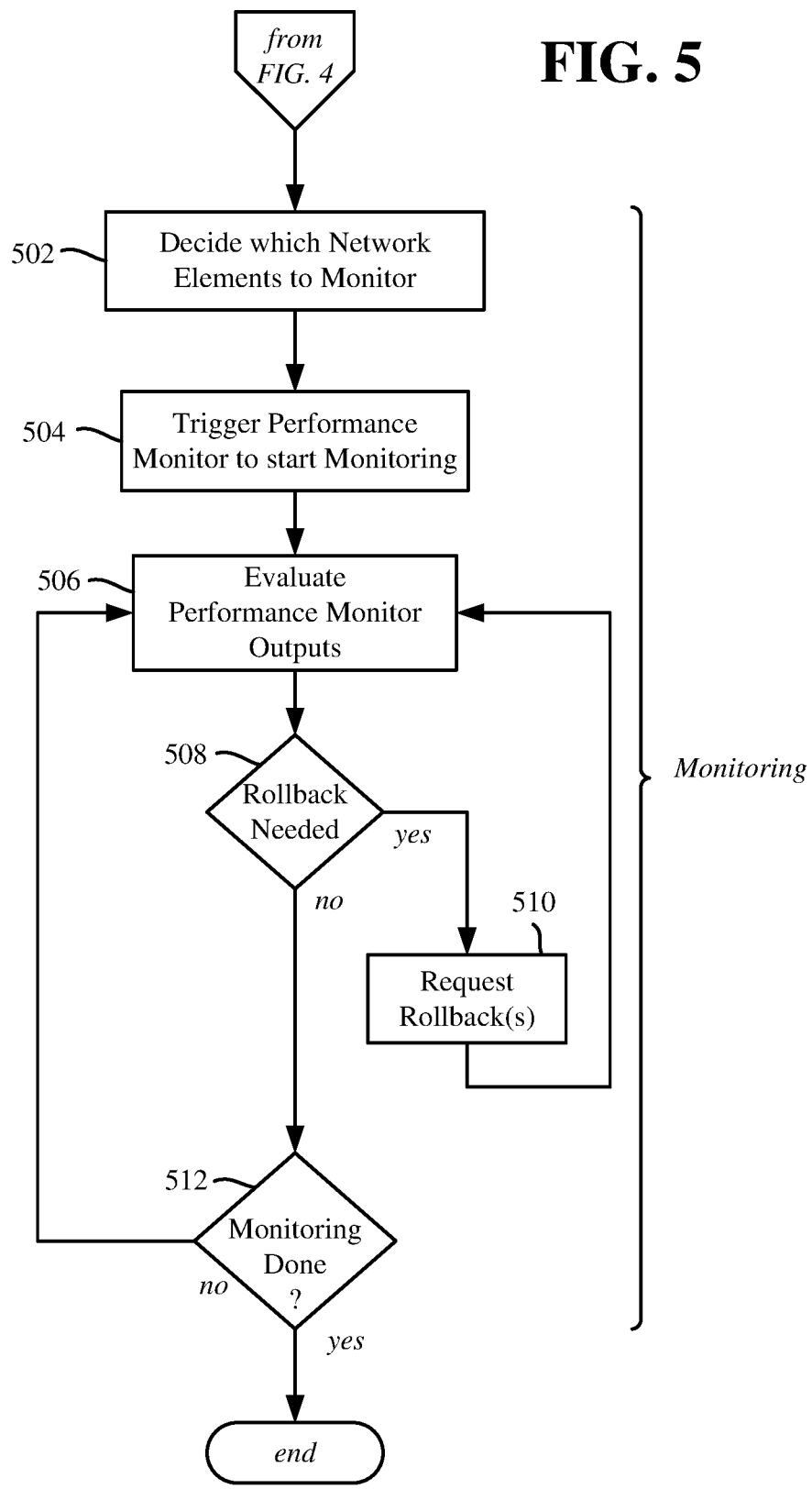
Figure 6:
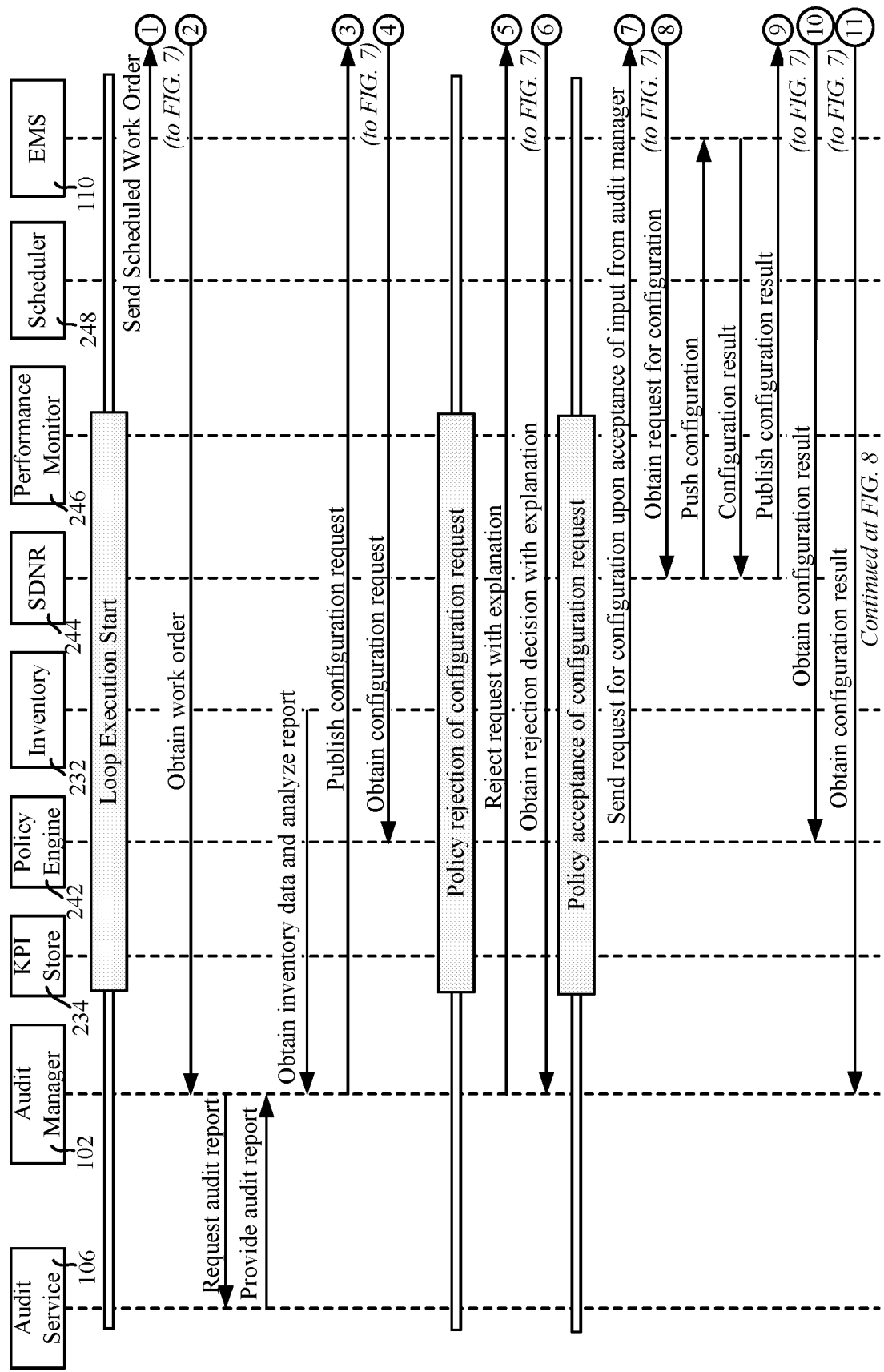
FIGS. 6-9 comprise a dataflow diagram illustrating example communications between components that automate reconfiguring network element parameters, in accordance with various aspects and embodiments of the subject disclosure.
Figure 7:
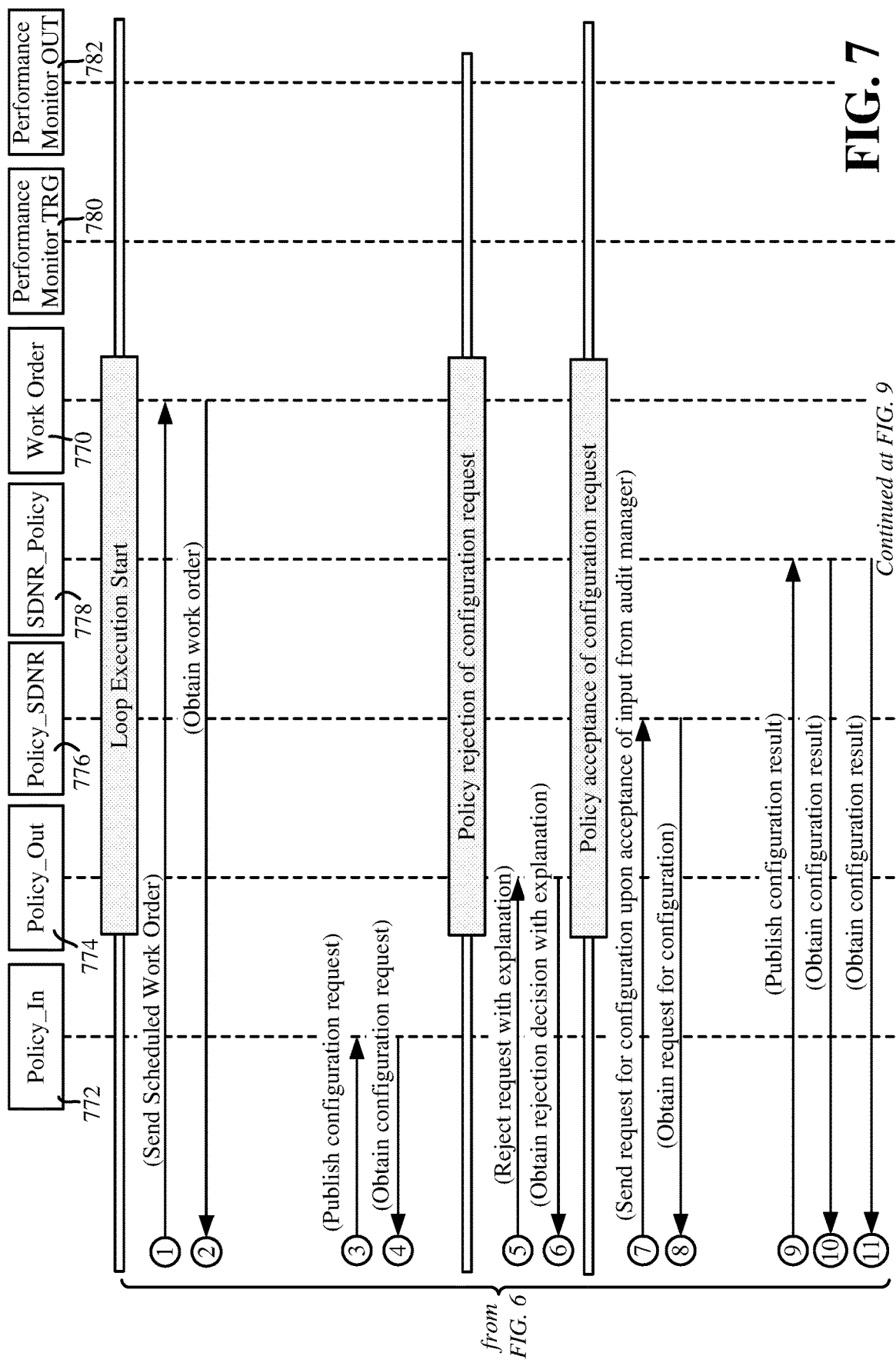
Figure 8:
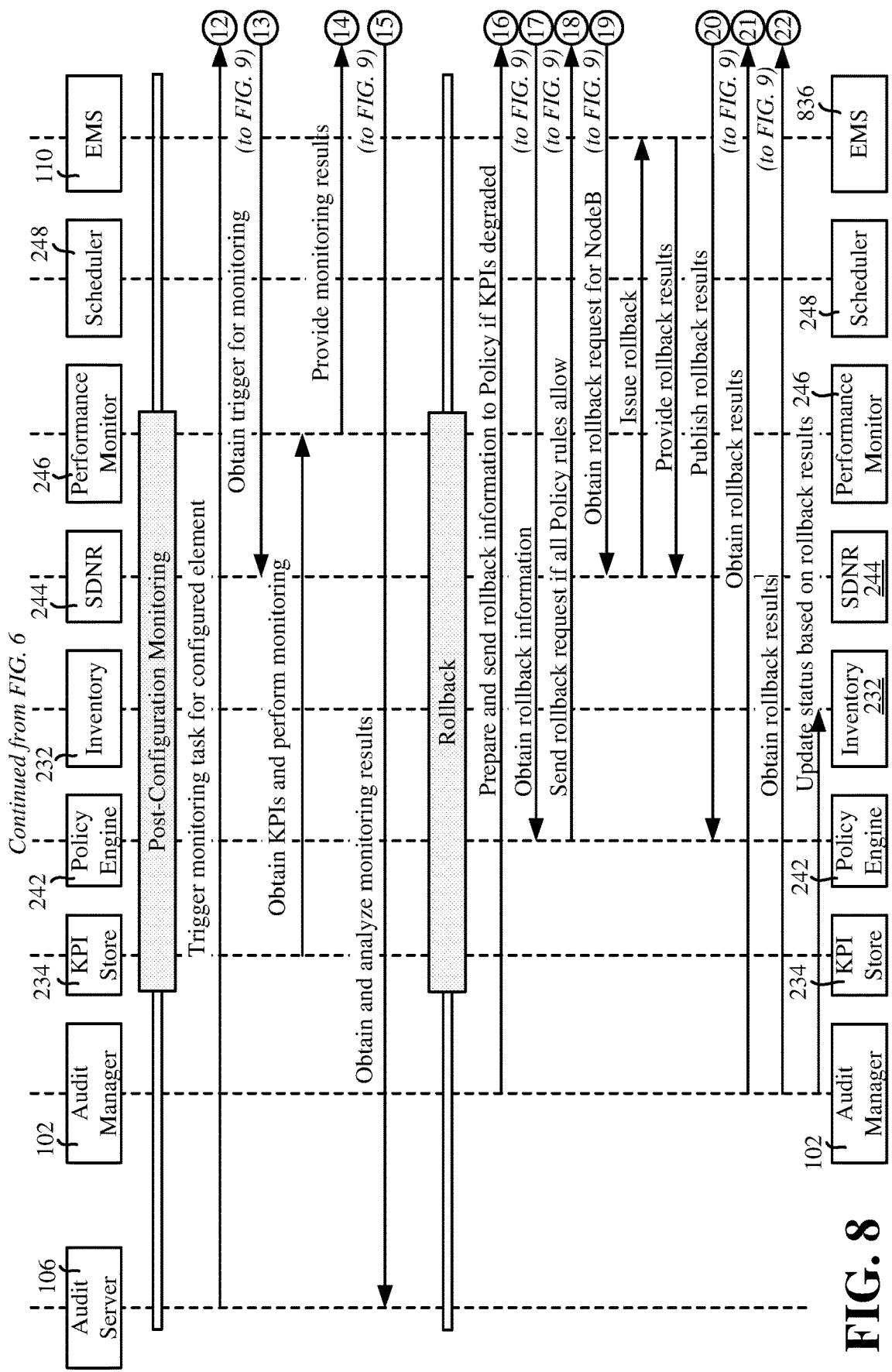
Figure 9:
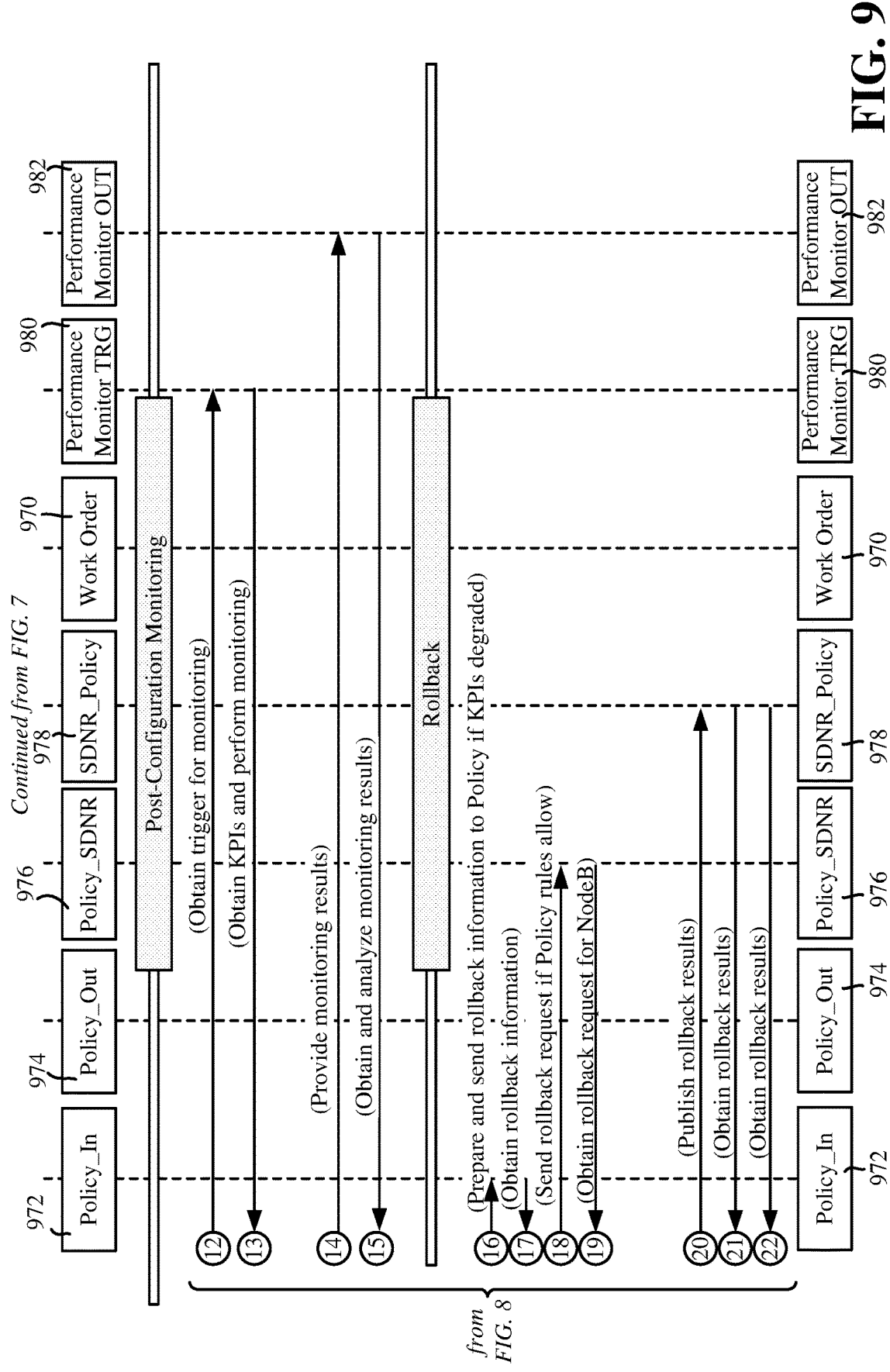

FIGS. 4 and 5 summarize various example operations of the audit manager 102. FIGS. 6-9 show the flow of communications and data between the various components described herein to illustrate how the audit manager 102 fits into the overall architecture.

Operation 402 of FIG. 4 represents the audit manager 102 obtaining the work orders from the scheduler 248, and based on the work orders, identifying the network region(s) that are to be reconfigured. Operation 404 represents the audit manager 102 obtaining the latest audit report (e.g., file) corresponding to a work order 770 (FIGS. 7 and 9) from the audit server as described herein, e.g., by instantiating a collector on demand.

Operation 406 represents the audit manager 102 parsing the audit report and filtering out non-approved parameters; (filtering can be performed by the instantiated collector, at least in part). As part of the parsing operations, the audit manager 102 can check the validity of the audit data, such as to validation parameter formats (e.g., the parameter value should be an integer, but the audit report has provided a string).

Operation 408 identifies the affected network elements, and cells and obtains their latest status from inventory 232; (note that some current status information can also be obtained from the self-organizing network applications manager 248 of FIG. 2).

In one implementation, for efficiency as represents by operation 410, the audit manager 102 creates a configuration plan and splits configuration requests into batches of X base stations at a time. For example, the audit manager 102 can organize network elements based on location. In this way, the audit manager 102 can check and ensure that certain collocated cell sites or base stations are collectively reconfigured as a group (e.g., concurrently).

Operation 412 dispatches each configuration batch sequentially by sending requests to the policy engine. Additional details of the communications between the policy engine 242 (including Policy_In 772, Policy_Out 774, Policy_SDNR 776, and SDNR_Policy 778) and the other various components of FIG. 2 are shown in FIGS. 6-9.

As represented by operation 414, in this example, it is assumed that the reconfiguration request was not rejected by the policy engine 242, and that the SDNR 244 returned a successful configuration result. The process thus continues to FIG. 5.

Operation 502 of FIG. 5 represents the audit manager 102 deciding which components/network elements are to be monitored, and operation 504 represents the audit manager 102 triggering the performance monitor 246 to start monitoring. The performance monitor triggering-related (block 780) and output-related (block 782) communications are shown in additional detail in FIGS. 6-9.

Operation 506 of FIG. 5 represents the audit manager 102 evaluating the output(s) from the performance monitor 246, e.g., any alerts and associated data. If a rollback is requested or needed for site (operation 508), operation 510 requests the rollback. Monitoring in general continues via operation 512 until done for a reconfiguration, e.g., after two hours or other configured time period.

To summarize, in general, radio equipment operates based on provisioned configuration of parameters that are typically determined by network operators in coordination with vendors. There are gold standard parameter values that have been assessed and are known to provide stable and efficient functionality for radio components. However, the task of ensuring that radio network elements are properly configured is highly complex, as multiple tens of thousands of base stations (e.g, 4G eNodeBs and 5G gNodeBs and beyond) and their associated cells are periodically reconfigured, whereby there can be multiple thousands of manual reconfigurations taking place daily, which is not only time consuming, but challenging to perform carefully. Misconfigurations can occur due to various reasons, such as manual changes, mistakes in configuration, bugs in automated systems, rollout of new equipment with non-gold standard default values, and so forth. Given the large volume, it is also difficult to manually evaluate the health of each reconfigured radio element.

As described herein, in general the audit manager 102 manages audits, organizes configurations, issues requests, processes results, invokes monitoring, processes the results of monitoring, maintains history, issues alerts, sends reports (e.g., daily) of what it has done. To this end, the audit manager 102 in conjunction with the overall architecture components operate to automatically correct the configuration of identified misconfigured radio elements, by automatically obtaining the latest parameter configuration status, deciding which of them are to be fixed, using adaptive logic and current network status, and automatically issue corrective actions for the network. The audit manager 102 further operates to monitor the network after action to ensure that cell sites work properly with no issues.

One implementation of an audit manager has proven an ability to successfully configure an average of 10 cell sites per minute, per element management systems, which translates to an average of 250 sites per minute nationwide (in the United States). It has been verified that the number of misconfigured parameters reduces down to zero or near zero within only a few automated iterations for each region. This allows applying operational benefits to a network within a very short amount of time. Such benefits are related to a network-wide performance improvement with direct benefit to mobile users, including quality of experience, energy savings, and the like.

Figure 10:
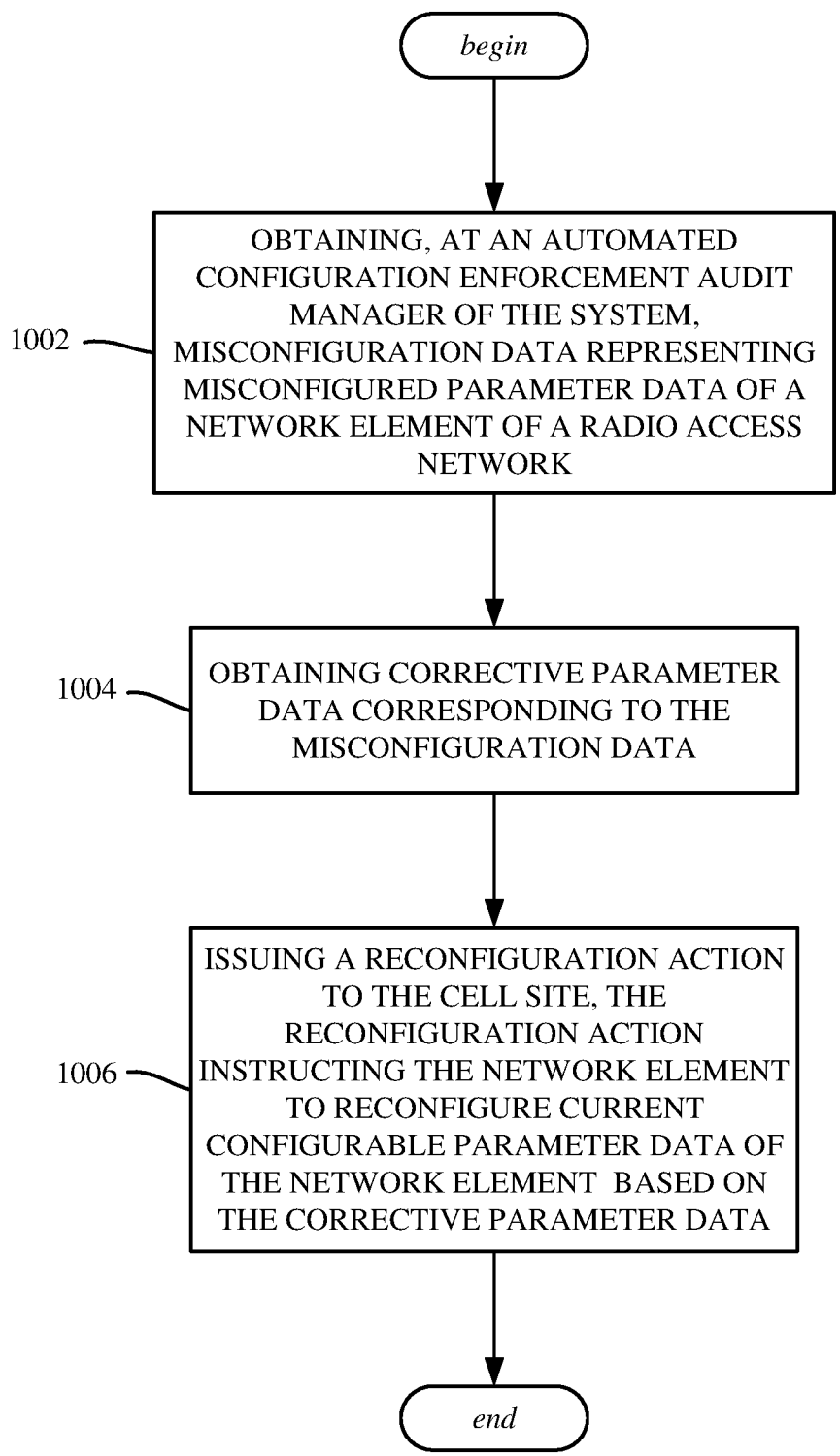
FIG. 10 is a flow diagram representing example operations for issuing a reconfiguration action to a network element to reconfigure misconfigured parameter data, in accordance with various aspects and embodiments of the subject disclosure.

One or more example aspects are represented in FIG. 10, and can correspond to a system, comprising a processor, and a memory that stores executable instructions that, when executed by the processor of the system, facilitate performance of operations. Example operation 1002 represents obtaining, at an automated configuration enforcement audit manager of the system, misconfiguration data representing misconfigured parameter data of a network element of a radio access network. Operation 1004 represents obtaining corrective parameter data corresponding to the misconfiguration data. Operation 1006 represents issuing a reconfiguration action to the network element, the reconfiguration action instructing the network element to reconfigure current configurable parameter data of the network element based on the corrective parameter data.

The misconfiguration data and the corrective parameter data can be received in audit report data representative of an audit report associated with the network element, and obtaining the corrective parameter data corresponding to the misconfiguration data can include filtering out a portion of the misconfiguration data and a corresponding portion of the corrective parameter data determined to be inconsequential to network element performance according to a defined performance impact criterion.

Further operations can include, based on a comparison of prior performance data of the network element prior to the reconfiguration action to post-reconfiguration performance data obtained from monitoring the network element after issuing the reconfiguration action, evaluating whether the network element performance is degraded after issuing the reconfiguration action. Evaluating whether the network element performance is degraded after issuing the reconfiguration action can include evaluating first throughput data of the prior performance data prior to the reconfiguration action relative to second throughput data of the post-reconfiguration performance data after issuing the reconfiguration action.

Further operations can include maintaining information corresponding to a prior state of the misconfigured parameter data before issuing the reconfiguration action, and in response to determining that the network element performance is degraded after issuing the reconfiguration action, issuing a restoration action instructing the network element to reconfigure the current configurable parameter data of the network element based on the information corresponding to the prior state of the misconfigured parameter data before issuing the reconfiguration action.

Further operations can include, in response to determining that the network element performance is degraded after issuing the reconfiguration action, generating alert data representative of an alert that the network element performance has become degraded.

The network element can include a group of radio network nodes collocated at the network element, and issuing the reconfiguration action can collectively reconfigure the current configurable parameter data of the group of radio network nodes.

Further operations can include outputting a report representing issuing the reconfiguration action.

Further operations can include communicating with a policy component of network equipment to obtain approval for issuing the reconfiguration action according to a policy associated with network element reconfiguration.

Further operations can include obtaining inventory data corresponding to a group of network elements including the network element, obtaining a work order that schedules reconfiguration of the group of network elements, and instantiating respective collectors to collect respective audit report data representative of audit reports for network elements of the group of network elements, the audit reports including an audit report containing the misconfiguration data and the corrective parameter data of the network element.

Obtaining the misconfiguration data and the corrective parameter data corresponding to the misconfiguration data can include communicating with a mobile broad-band auditing service.

Further operations can include validating the corrective parameter data prior to issuing the reconfiguration action.

Further operations can include evaluating internal policy data of the automated configuration enforcement audit manager to determine that the network element is allowed to be reconfigured prior to the issuing the reconfiguration action.

Figure 11:
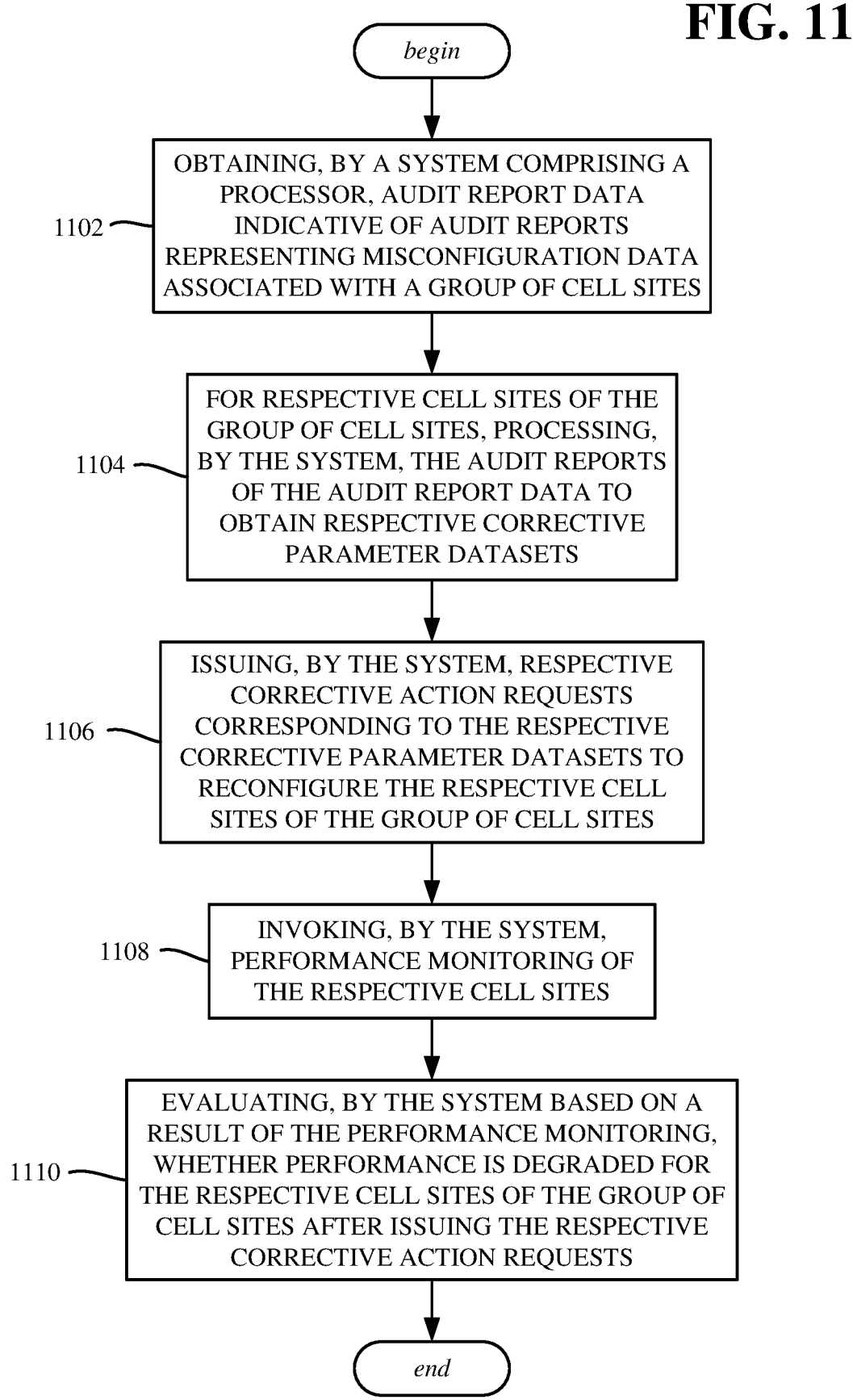
FIG. 11 is a flow diagram representing example operations for reconfiguring a cell site and monitoring the performance after the reconfiguration, in accordance with various aspects and embodiments of the subject disclosure.

One or more example aspects are represented in FIG. 11, and can correspond to example operations of a method. Operation 1102 represents obtaining, by a system including a processor, audit report data indicative of audit reports representing misconfiguration data associated with a group of cell sites. Operation 1104 represents, for respective cell sites of the group of cell sites, processing, by the system, the audit reports of the audit report data to obtain respective corrective parameter datasets. Operation 1106 represents issuing, by the system, respective corrective action requests corresponding to the respective corrective parameter datasets to reconfigure the respective cell sites of the group of cell sites. Operation 1108 represents invoking, by the system, performance monitoring of the respective cell sites. Operation 1110 represents evaluating, by the system based on a result of the performance monitoring, whether performance is degraded for the respective cell sites of the group of cell sites after issuing the respective corrective action requests.

The evaluating can determine that a selected cell site of the group of cell sites has degraded performance; aspects can include issuing a restoration action to the selected cell site to revert to a corrective parameter dataset of the selected cell site to a prior parameter dataset.

Further aspects can include at least one of: instantiating, by the system, collectors to obtain the audit reports, validating, by the system, information in the respective corrective parameter datasets prior to issuing the respective corrective action requests, issuing, by the system, an alert, or outputting, by the system, a report.

Issuing the respective corrective action requests can include issuing a corrective action request to collectively reconfigure a group of radio network nodes collocated at a cell site of the group of cell sites.

Figure 12:
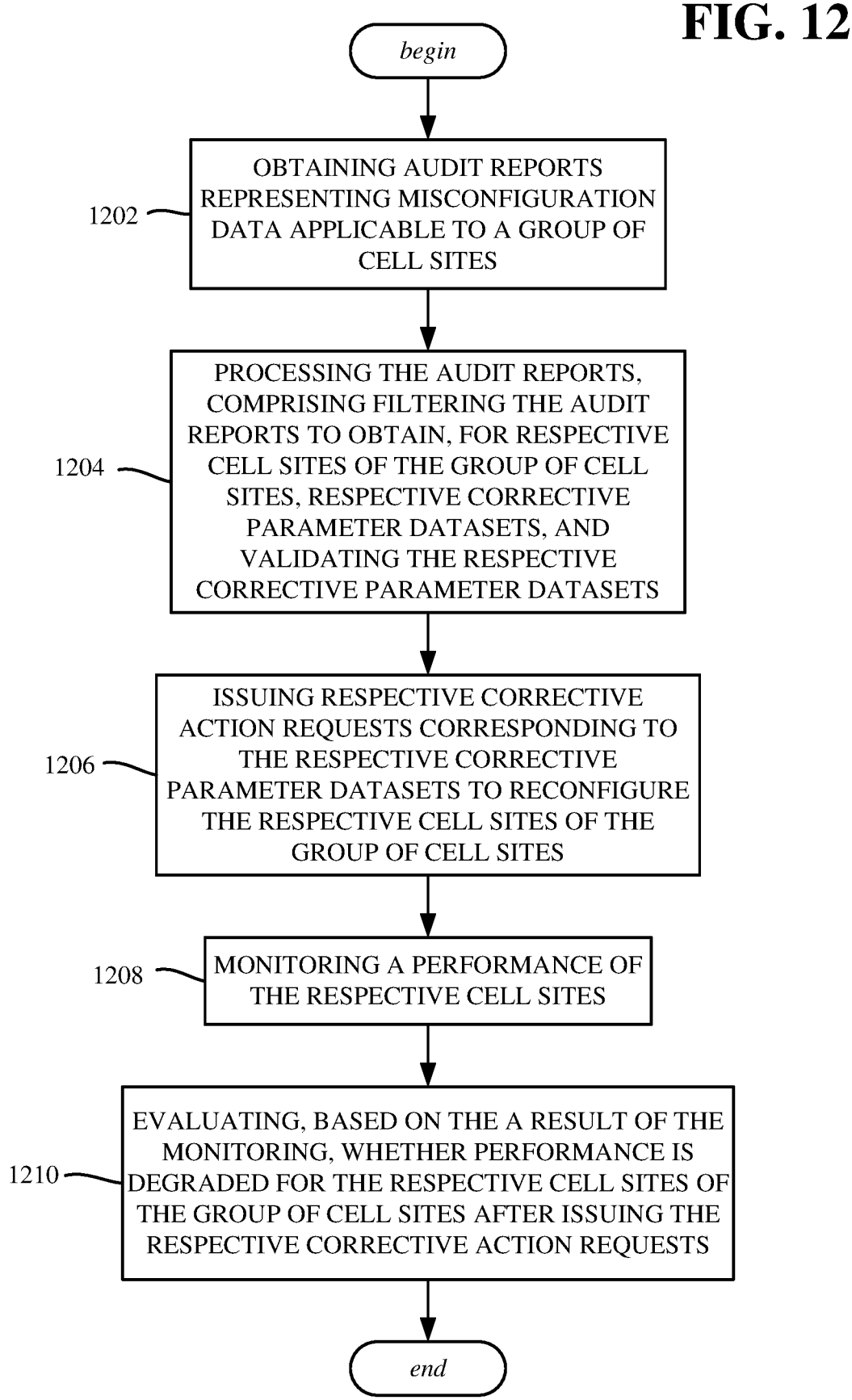
FIG. 12 is a flow diagram representing example operations for reconfiguring a cell site based on audit reports, and monitoring the performance after the reconfiguration, in accordance with various aspects and embodiments of the subject disclosure.

One or more aspects are represented in FIG. 12, such as implemented in a machine-readable medium, comprising executable instructions that, when executed by a processor, facilitate performance of operations. Example operation 1202 represents obtaining audit reports representing misconfiguration data applicable to a group of cell sites. Operation 1204 represents processing the audit reports, including filtering the audit reports to obtain, for respective cell sites of the group of cell sites, respective corrective parameter datasets, and validating the respective corrective parameter datasets. Operation 1206 represents issuing respective corrective action requests corresponding to the respective corrective parameter datasets to reconfigure the respective cell sites of the group of cell sites. Operation 1208 represents monitoring a performance of the respective cell sites. Operation 1210 represents evaluating, based on the a result of the monitoring, whether performance is degraded for the respective cell sites of the group of cell sites after issuing the respective corrective action requests.

Further operations can include ascertaining a scheduled reconfiguration of the group of cell sites, and in response to the ascertaining of the scheduled reconfiguration, instantiating a group of collectors to obtain the audit reports representing the misconfiguration data applicable to the group of cell sites.

The evaluating can determine that a selected cell site of the group of cell sites has degraded performance; further operations can include maintaining respective prior parameter datasets corresponding to the respective corrective parameter datasets before issuing the respective corrective action requests, and issuing a restoration action to the selected cell site to revert to a corrective parameter dataset of the selected cell site to a prior parameter dataset of the selected cell site.

As can be seen, the technology described herein facilitates automatically correcting erroneous RAN parameter configurations. The technology described herein provides an automation solution that can detect, evaluate and reliably correct millions of parameter misconfigurations across LTE and 5G networks (and beyond) typically within a few hours, supporting gold standard parameter auditing and rectification processes. Such tasks had been partially performed by a vendor-proprietary solution, which had significant limitations in terms of configurability and network health-check monitoring subsequent to parameter changes. The technology described herein thus can assist RAN engineering teams in performing their tasks more efficiently via handling massive amount of work items that are very tedious to execute manually, and thus can significantly reduce operational expenses.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FAD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FAD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 13:
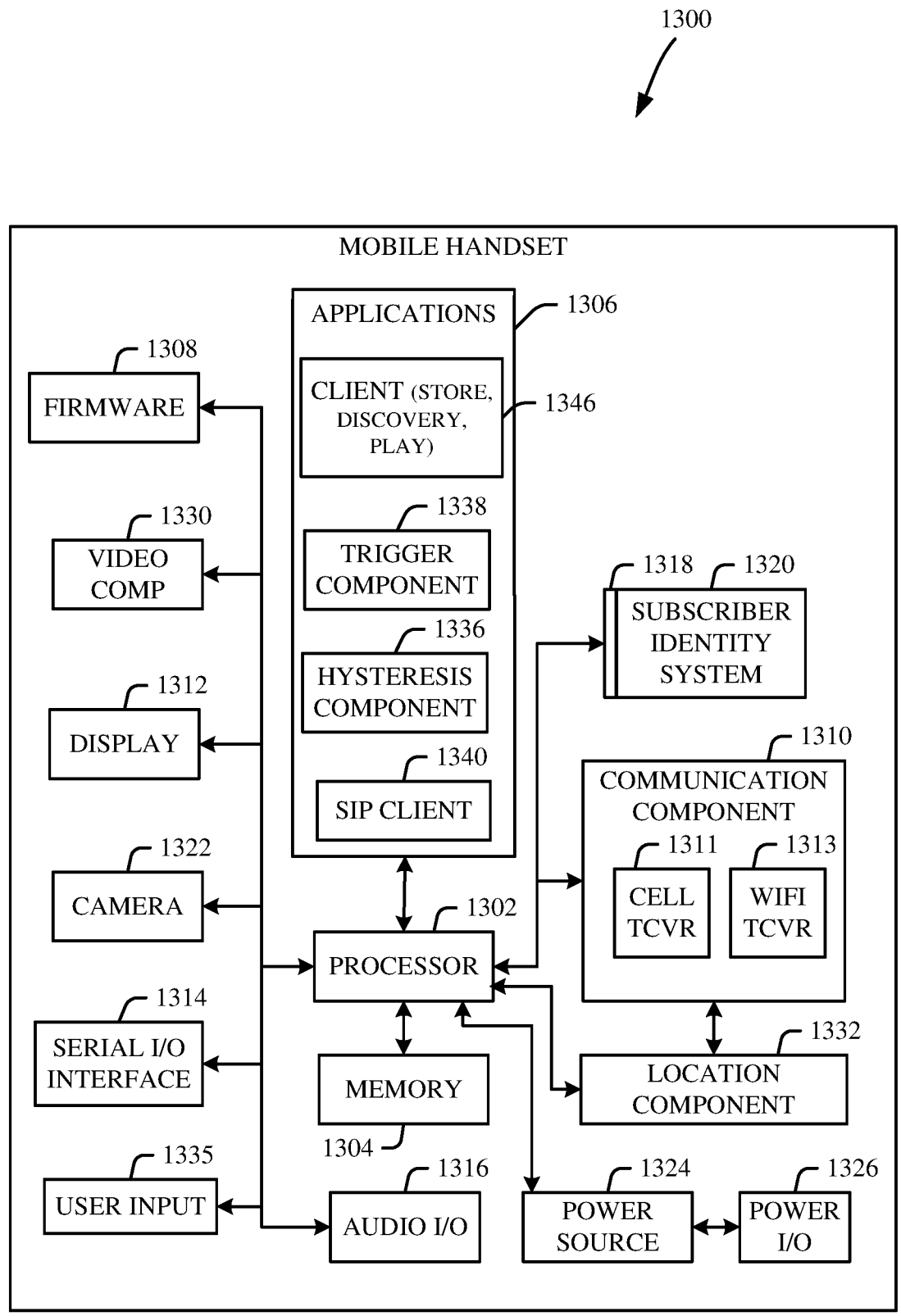
FIG. 13 illustrates an example block diagram of an example mobile handset operable to engage in a system architecture that facilitates wireless communications according to one or more embodiments described herein.

Referring now to FIG. 13, illustrated is a schematic block diagram of an example end-user device (such as user equipment) that can be a mobile device 1300 capable of connecting to a network in accordance with some embodiments described herein. Although a mobile handset 1300 is illustrated herein, it will be understood that other devices can be a mobile device, and that the mobile handset 1300 is merely illustrated to provide context for the embodiments of the various embodiments described herein. The following discussion is intended to provide a brief, general description of an example of a suitable environment 1300 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1300 includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communication component 1310 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1322 (e.g., a camera) can be provided for decoding encoded multimedia content. The video processing component 1322 can aid in facilitating the generation, editing and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300.

As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1338 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 810, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
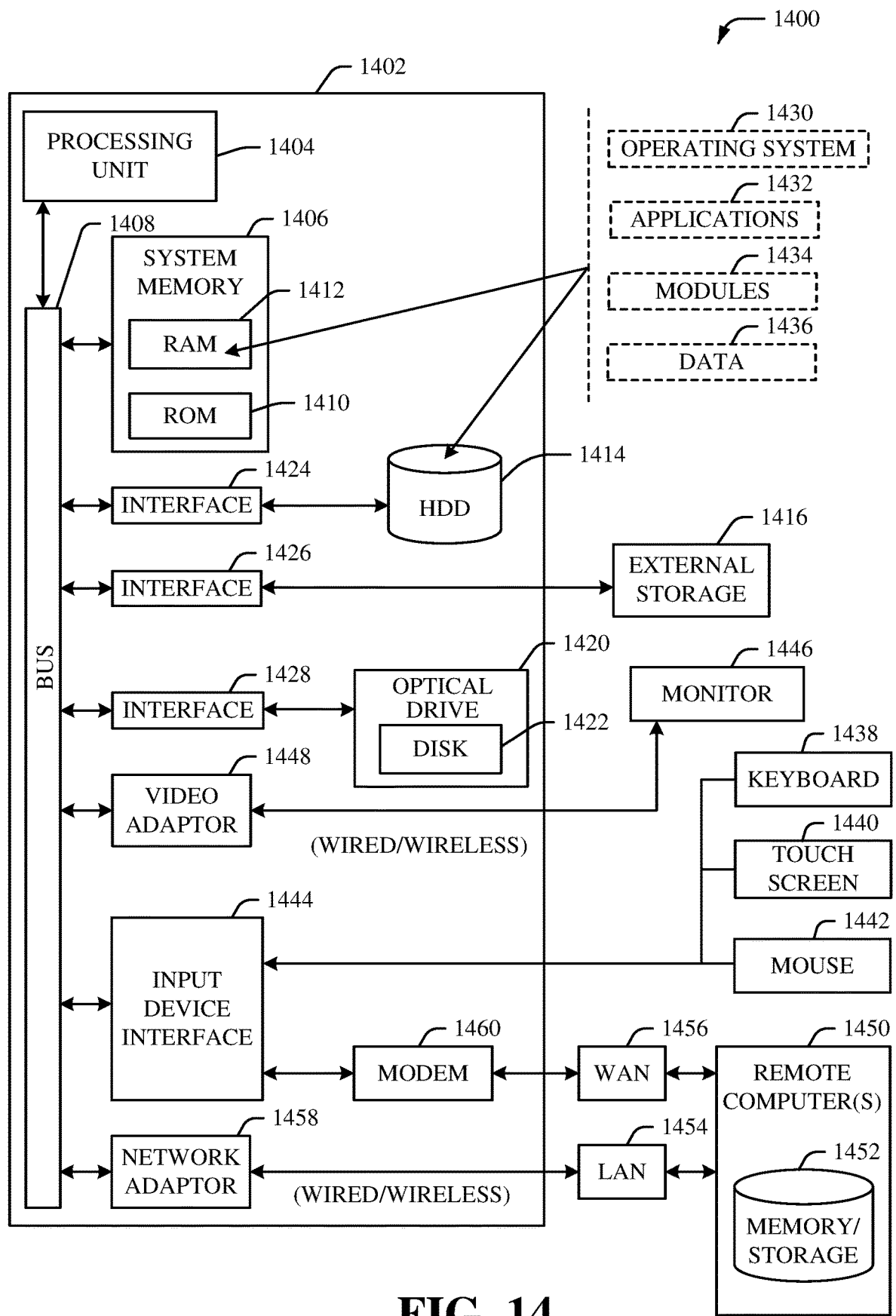
FIG. 14 illustrates an example block diagram of an example computer/machine system operable to engage in a system architecture that facilitates wireless communications according to one or more embodiments described herein.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FAD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD), non-volatile memory and other storage technology could be used in addition to, or in place of, an HDD 1414, and can be internal or external. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally include emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can include one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 14 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor, facilitate performance of operations, the operations comprising:
   obtaining, at an automated configuration enforcement audit manager of the system, misconfiguration data representing misconfigured parameter data of a network element of a radio access network;
   obtaining corrective parameter data corresponding to the misconfiguration data, wherein the misconfiguration data and the corrective parameter data are received in audit report data representative of an audit report associated with the network element, and wherein obtaining the corrective parameter data corresponding to the misconfiguration data comprises filtering out a portion of the misconfiguration data and a corresponding portion of the corrective parameter data determined to be inconsequential to network element performance according to a defined performance impact criterion; and
   issuing a reconfiguration action to the network element, the reconfiguration action instructing the network element to reconfigure current configurable parameter data of the network element based on the corrective parameter data.

2. The system of claim 1, wherein the operations further comprise, based on a comparison of prior performance data of the network element prior to the reconfiguration action to post-reconfiguration performance data obtained from monitoring the network element after issuing the reconfiguration action, evaluating whether the network element performance is degraded after issuing the reconfiguration action.

3. The system of claim 2, wherein the evaluating whether the network element performance is degraded after issuing the reconfiguration action comprises evaluating first throughput data of the prior performance data prior to the reconfiguration action relative to second throughput data of the post-reconfiguration performance data after issuing the reconfiguration action.

4. The system of claim 2, wherein the operations further comprise maintaining information corresponding to a prior state of the misconfigured parameter data before issuing the reconfiguration action, and in response to determining that the network element performance is degraded after issuing the reconfiguration action, issuing a restoration action instructing the network element to reconfigure the current configurable parameter data of the network element based on the information corresponding to the prior state of the misconfigured parameter data before issuing the reconfiguration action.

5. The system of claim 2, wherein the operations further comprise, in response to determining that the network element performance is degraded after issuing the reconfiguration action, generating alert data representative of an alert that the network element performance has become degraded.

6. The system of claim 1, wherein the network element comprises a group of radio network nodes collocated at the network element, and wherein issuing the reconfiguration action collectively reconfigures the current configurable parameter data of the group of radio network nodes.

7. The system of claim 1, wherein the operations further comprise outputting a report representing issuing the reconfiguration action.

8. The system of claim 1, wherein the operations further comprise communicating with a policy component of network equipment to obtain approval for issuing the reconfiguration action according to a policy associated with network element reconfiguration.

9. The system of claim 1, wherein the operations further comprise obtaining inventory data corresponding to a group of network elements comprising the network element, obtaining a work order that schedules reconfiguration of the group of network elements, and instantiating respective collectors to collect respective audit report data representative of audit reports for network elements of the group of network elements, the audit reports comprising the audit report containing the misconfiguration data and the corrective parameter data of the network element.

10. The system of claim 1, wherein obtaining the misconfiguration data and the corrective parameter data corresponding to the misconfiguration data comprises communicating with a mobile broad-band auditing service.

11. The system of claim 1, wherein the operations further comprise validating the corrective parameter data prior to issuing the reconfiguration action.

12. The system of claim 1, wherein the operations further comprise evaluating internal policy data of the automated configuration enforcement audit manager to determine that the network element is allowed to be reconfigured prior to the issuing the reconfiguration action.

13. A method, comprising:
obtaining, by a system comprising a processor, audit report data indicative of audit reports representing misconfiguration data associated with a group of cell sites;
for respective cell sites of the group of cell sites, processing, by the system, the audit reports of the audit report data to obtain respective corrective parameter datasets;
issuing, by the system, respective corrective action requests corresponding to the respective corrective parameter datasets to reconfigure the respective cell sites of the group of cell sites;
invoking, by the system, performance monitoring of the respective cell sites; and
evaluating, by the system based on a result of the performance monitoring, whether performance is degraded for the respective cell sites of the group of cell sites after issuing the respective corrective action requests.

14. The method of claim 13, wherein the evaluating determines that a selected cell site of the group of cell sites has degraded performance, and further comprising issuing a restoration action to the selected cell site to revert to a corrective parameter dataset of the selected cell site to a prior parameter dataset.

15. The method of claim 13, further comprising at least one of: instantiating, by the system, collectors to obtain the audit reports, validating, by the system, information in the respective corrective parameter datasets prior to issuing the respective corrective action requests, issuing, by the system, an alert, or outputting, by the system, a report.

16. The method of claim 13, wherein issuing the respective corrective action requests comprises issuing a corrective action request to collectively reconfigure a group of radio network nodes collocated at a cell site of the group of cell sites.

17. A non-transitory machine-readable medium, comprising executable instructions that, when executed by a processor, facilitate performance of operations, the operations comprising:
obtaining audit reports representing misconfiguration data applicable to a group of cell sites;
processing the audit reports, comprising filtering the audit reports to obtain, for respective cell sites of the group of cell sites, respective corrective parameter datasets, and validating the respective corrective parameter datasets;
issuing respective corrective action requests corresponding to the respective corrective parameter datasets to reconfigure the respective cell sites of the group of cell sites;
monitoring a performance of the respective cell sites; and
evaluating, based on a result of the monitoring, whether the performance is degraded for the respective cell sites of the group of cell sites after issuing the respective corrective action requests.

18. The non-transitory machine-readable medium of claim 17, wherein the operations further comprise ascertaining a scheduled reconfiguration of the group of cell sites, and in response to the ascertaining of the scheduled reconfiguration, instantiating a group of collectors to obtain the audit reports representing the misconfiguration data applicable to the group of cell sites.

19. The non-transitory machine-readable medium of claim 17, wherein the evaluating determines that a selected cell site of the group of cell sites has degraded performance, and wherein the operations further comprise maintaining respective prior parameter datasets corresponding to the respective corrective parameter datasets before issuing the respective corrective action requests, and issuing a restoration action to the selected cell site to revert to a corrective parameter dataset of the selected cell site to a prior parameter dataset of the selected cell site.

20. The non-transitory machine-readable medium of claim 17, wherein the operations further comprise at least one of: instantiating collectors to obtain the audit reports, validating information in the respective corrective parameter datasets prior to issuing the respective corrective action requests, issuing an alert, or outputting a report.

\* \* \* \* \*